(12) United States Patent
Watanabe et al.

(10) Patent No.: US 8,622,179 B2
(45) Date of Patent: Jan. 7, 2014

(54) PARKING BRAKE CONTROL DEVICE

(75) Inventors: Takashi Watanabe, Nagoya (JP);
Tetsuaki Tsuzuki, Gamagoori (JP);
Kazuma Kondo, Aichi-gun (JP);
Kentaro Yuasa, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 237 days.

(21) Appl. No.: 13/129,631

(22) PCT Filed: Sep. 9, 2010

(86) PCT No.: PCT/JP2010/065485
§ 371 (c)(1),
(2), (4) Date: May 17, 2011

(87) PCT Pub. No.: WO2011/033983
PCT Pub. Date: Mar. 24, 2011

(65) Prior Publication Data
US 2011/0278108 A1 Nov. 17, 2011

(30) Foreign Application Priority Data
Sep. 18, 2009 (JP) .................................. 2009-217236

(51) Int. Cl.
*F16D 55/22* (2006.01)
(52) U.S. Cl.
USPC ................. 188/72.3; 188/1.11 E; 188/1.11 L; 188/18 A; 188/72.1; 188/156; 188/158; 188/265; 303/20; 303/89; 303/113.4; 303/113.5; 303/167; 303/191; 701/70; 701/71
(58) Field of Classification Search
USPC ................ 188/72.3, 72.1, 71.9; 303/20, 22.1, 303/22.7, 22.8
See application file for complete search history.

(56) References Cited

U.S. PATENT DOCUMENTS

| | | | |
|---|---|---|---|
| 6,748,310 B2* | 6/2004 | Tamasho et al. | 701/70 |
| 2006/0267402 A1* | 11/2006 | Leiter et al. | 303/20 |

(Continued)

FOREIGN PATENT DOCUMENTS

| | | |
|---|---|---|
| JP | 2003-083373 A | 3/2003 |
| JP | 2007-519568 A | 7/2007 |

(Continued)

OTHER PUBLICATIONS

International Preliminary Report on Patentability (Form PCT/IB/373) and the Written Opinion of the International Searching Authority (Form PCT/ISA/237) issued on Apr. 11, 2012, in the corresponding International Application No. PCT/JP2010/065485. (5 pages).

(Continued)

*Primary Examiner* — Robert A Siconolfi
*Assistant Examiner* — San Aung
(74) *Attorney, Agent, or Firm* — Buchanan Ingersoll & Rooney PC

(57) ABSTRACT

A parking brake control device performs a releasing control with good precision by more precisely maintaining clearance between a friction-applying member and a friction-applied member. During a releasing control, a timing at which a braking force generated by an electric parking brake 2 drops to zero is detected based on a change in a motor current, and a second releasing operation time is set according to the magnitude of the motor current at the time the braking force drops to zero. This makes it possible for the second releasing operation time to be set in accordance with fluctuations in a motor load due to temperature changes or the like. Therefore, a clearance between a brake pad and a brake disc can be kept constant according to the motor load.

12 Claims, 10 Drawing Sheets

(56) References Cited

U.S. PATENT DOCUMENTS

| | | | |
|---|---|---|---|
| 2008/0185235 A1* | 8/2008 | Suzuki | 188/1.11 E |
| 2008/0303342 A1* | 12/2008 | Kodaka et al. | 303/167 |
| 2009/0032342 A1* | 2/2009 | Yamaguchi | 188/72.3 |
| 2009/0099748 A1* | 4/2009 | Watanabe et al. | 701/70 |
| 2009/0315391 A1* | 12/2009 | Tanaka et al. | 303/113.5 |

FOREIGN PATENT DOCUMENTS

| | | | |
|---|---|---|---|
| JP | 2008-056090 A | 3/2008 | |
| JP | 2009-001151 A | 1/2009 | |
| JP | 2009-090854 A | 4/2009 | |

OTHER PUBLICATIONS

International Search Report (PCT/ISA/210) issued on Dec. 28, 2010, by Japanese Patent Office as the International Searching Authority for International Application No. PCT/JP2010/065485.

Written Opinion (PCT/ISA/237) issued on Dec. 28, 2010, by Japanese Patent Office as the International Searching Authority for International Application No. PCT/JP2010/065485.

* cited by examiner

PARKING BRAKE CONTROL DEVICE

TECHNICAL FIELD

The present invention relates to a parking brake control device that performs locking and releasing control of an electric parking brake (hereinafter called the EPB).

BACKGROUND ART

The use of a parking brake to restrict the movement of a vehicle when it is parked is known. The parking brake may be, for example, a manual type in which an operating force is transmitted to a brake mechanism by the pulling of a brake cable by a operating lever, an electric type in which the rotational force of a motor is transmitted to the brake mechanism, or the like.

With the electric type parking brake, or EPB, to lock the EPB, the motor rotates in a locking direction (rotates in a forward direction), and the rotational force of the motor is transmitted to the brake mechanism, generating a braking force. In that state, the operation of the motor is stopped. To release the EPB, the motor rotates in a releasing direction (rotates in reverse), which cancels the braking force.

An EPB that performs this sort of locking and releasing control is disclosed in Japanese Patent Application Publication No. JP-A-2009-1151, for example. In the EPB that is disclosed in Japanese Patent Application Publication No. JP-A-2009-1151, basically, the termination of the releasing control is determined based on a motor revolution speed that is detected by a rotation sensor. In the event that the rotation sensor fails, the determination is made based on the electric current of the motor. Furthermore, when the releasing control is in effect, the braking force is regarded as having dropped to zero if the motor current becomes no greater than a specified value, at which point the motor is operated for a specified period of time, after which the releasing control is terminated. In other words, after the point when the braking force has dropped to zero, because a brake pad that is a friction-applying member has separated from a brake disc that is a friction-applied member, operating the motor for the specified period of time creates a specified clearance between the brake pad and the brake disc, after which the operation of the motor is terminated.

However, because the motor current varies according to changes in gear transmission efficiency and the like that are due to variations in temperature and the like, the time when the motor current becomes no greater than the specified value and the time when the braking force drops to zero are not necessarily the same time, as they are in the EPB that is disclosed in Patent Literature 1. Therefore, simply terminating the operation of the motor after the specified period of time has elapsed since the point when the motor current became no greater than the specified value makes it impossible to perform the releasing control with good precision, because the clearance that is provided between the brake pad and the brake disc is not constant.

According to Patent Literature 2, the releasing control can be performed with good precision by defining the point during the releasing control when a change (a differential value) in the motor current becomes no greater than a specified value as the point when the braking force becomes zero. In other words, the motor current varies for the reasons that are described above, but the change in the motor current does not vary for the reasons that are described above, so the time when the braking force drops to zero can be determined accurately based on the change in the motor current. Therefore, the clearance between the brake pad and the brake disc can be made constant, and the releasing control can be performed with good precision.

CITATION LIST

Patent Literature

Patent Literature 1: Japanese Patent Application Publication No. JP-A-2009-1151
Patent Literature 2: Japanese Patent Application Publication No. JP-A-2009-90854

SUMMARY OF INVENTION

Technical Problem

However, the revolution speed of the motor fluctuates according to fluctuations in the motor load that are due to temperature changes, a tightening force on a nut, or the like. Therefore, the motor revolution speed is not constant when the motor is operated for the specified period of time after the braking force has dropped to zero, creating the possibility that the clearance between the brake pad and the brake disc will not be constant. Therefore, the clearance between the brake pad and the brake disc cannot be ensured, giving a driver the feeling that the brake is dragging, as though the braking force was still being applied even though the brake has been released.

The present invention addresses these issues and provides a parking brake control device that can perform the releasing control with good precision by more precisely maintaining the clearance between the friction-applying member and the friction-applied member.

Solution to Problem

In order to address the issues, according to a first aspect, the present invention includes a determination means that, when a releasing control means acquires a motor electric current that flows when a motor is being operated, determines whether an absolute value of a differential value of the acquired motor electric current has exceeded a threshold value; an operation time setting means that, if it is determined by the determination means that the absolute value of the differential value of the acquired motor electric current has exceeded the threshold value, sets a releasing operation time, based on the motor electric current at the time that the determination is made, that is a time from when the determination is made until the operating of the motor is stopped; and an operation stopping means that measures the releasing operation time that has been set by the operation time setting means, and stops the operating of the motor when the releasing operation time has elapsed after it is determined by the determination means that the absolute value of the differential value of the acquired motor electric current does not exceed the threshold value.

According to this configuration, during the releasing control, a timing when a braking force that is generated by an EPB drops to zero is detected based on the differential value of the motor electric current, and the releasing operation time, which is the time from when the braking force drops to zero until the motor operation is stopped, is set in accordance with the magnitude of the motor electric current at the time when the braking force drops to zero. Therefore, the releasing operation time may also be set in accordance with the fluctuations in the motor load that are due to temperature changes or the like.

It is therefore possible to ensure the clearance between the friction-applying member and the friction-applied member. The ensuring of the more precise clearance between the friction-applying member and the friction-applied member makes it possible for the parking brake control device to perform the releasing control with good precision.

Specifically, the releasing operation time can be set to a longer time by the operation time setting means to the extent that the motor electric current has become greater.

It is thought that, to the extent that the motor electric current becomes greater, the motor load that arises due to fluctuations increases, and the motor revolution speed decreases, so the releasing operation time can be set to a longer time.

For example, the parking brake control device may be applied in a brake system that includes an electric parking brake and a service brake, the electric parking brake including an impelling shaft that, when the motor is operated such that it rotates, is moved in a straight line by a converting of the rotation of the motor into a linear movement, the movement of the impelling shaft moving the friction-applying member in the direction toward the friction-applied member when the motor is operated such that it rotates in the forward direction, thus causing the braking force to be generated by the electric parking brake, and the movement of the impelling shaft moving the friction-applying member in the direction separates it from the friction-applied member when the motor is operated such that it rotates in the reverse direction, thus causing the braking force to be decreased by the electric parking brake, and the service brake generating a braking force by moving the friction-applying member in the direction toward the friction-applied member when a wheel cylinder pressure is generated within a brake fluid chamber by an operating of a brake pedal by a driver. In the brake system, the friction-applying member is moved in a straight line by the linear moving of the impelling shaft within the brake fluid chamber.

In a case where this sort of configuration is used, it is preferable for the wheel cylinder pressure to be detected by a pressure detection means, an additional time by which the releasing operation time is extended to be set by the operation time setting means, based on the wheel cylinder pressure that is detected by the pressure detection means, a time that is the sum of the releasing operation time and the additional time that have been set by the operation time setting means to be measured by the operation stopping means, and for the operating of the motor to be stopped when the time that is the sum of the releasing operation time and the additional time has elapsed after it is been determined by the determination means that the absolute value of the differential value of the acquired motor electric current does not exceed the threshold value, In this manner, the wheel cylinder pressure that is generated in accordance with the depressing of the brake pedal by the driver is taken into account by adding the additional time to the releasing operation time that is set in accordance with the motor load. This makes it possible, in a case where the braking force is generated by the depressing of the brake pedal by the driver, for the effect of the driver's depressing of the brake pedal to be taken into account in the performing of the releasing control, making it possible to prevent the clearance between the friction-applying member and the friction-applied member from being insufficient, even if the driver depresses the brake pedal. It is therefore possible to prevent the driver from being given the feeling that the brake is dragging.

Specifically, the additional time can be set to a longer time by the operation time setting means to the extent that the wheel cylinder pressure that is detected by the pressure detection means has become greater.

Thus the braking force that remains due the depressing of the brake pedal by the driver is increased to the extent that the wheel cylinder pressure has become greater, so operating the motor for a correspondingly longer time makes it possible to prevent the clearance from being insufficient.

A second aspect of the present invention also includes a maximum value storage means that determines a maximum wheel cylinder pressure value that is the maximum value of the wheel cylinder pressure that is detected by the pressure detection means while in the releasing control, and that stores the maximum wheel cylinder pressure value. The additional time by which the releasing operation time is extended is set by the operation time setting means, based on the maximum wheel cylinder pressure value that is stored in the maximum value storage means.

If the additional time by which the releasing operation time is extended is thus set based on the maximum wheel cylinder pressure value, the additional time can be set even in a case where the driver pumps the brake pedal. It is therefore possible to prevent the clearance between the friction-applying member and the friction-applied member from being insufficient and to prevent the driver from being given the feeling that the brake is dragging.

DESCRIPTION OF EMBODIMENTS

Figure 1:
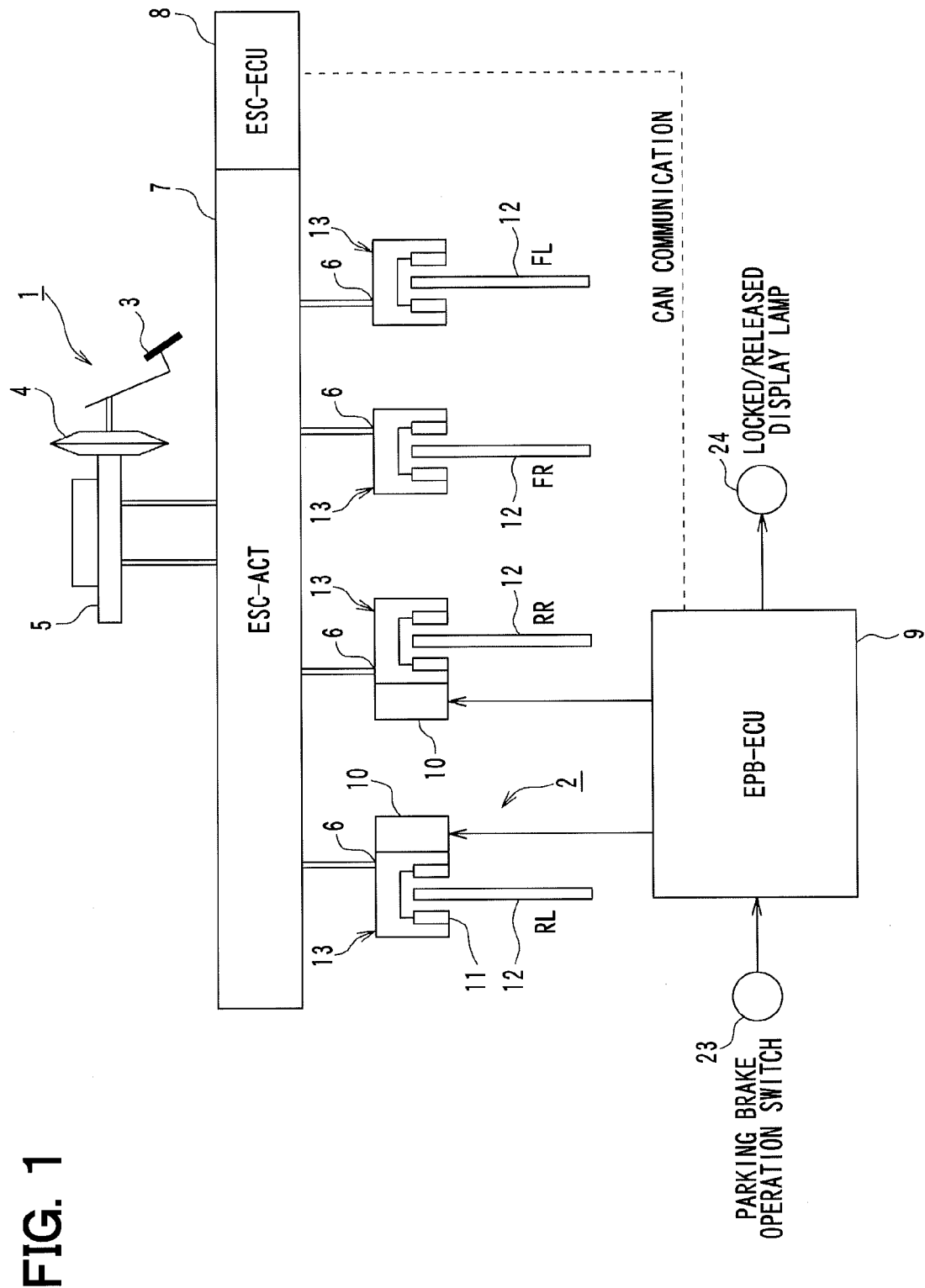
FIG. 1 is a schematic figure that shows an overall configuration of a vehicle brake system to which a parking brake control device according to a first embodiment of the present invention is applied.

Hereinafter, embodiments of the present invention will be explained based on the drawings. Note that portions that are one of the same and equivalent in each of the embodiments that are hereinafter described are assigned the same reference numerals in the drawings.

First Embodiment

Figure 2:
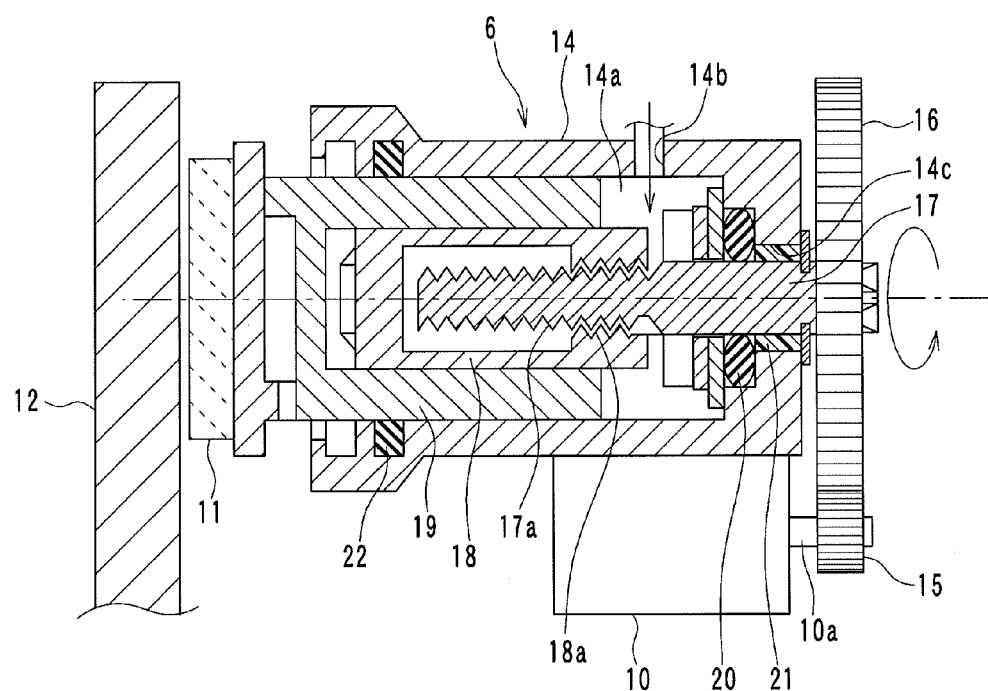
FIG. 2 is a schematic section view of a rear wheel brake mechanism that is provided in the brake system that is shown in FIG. 1.

A first embodiment of the present invention will be explained. The present embodiment uses as an example a vehicle brake system in which a disc brake type EPB is applied to a rear wheel. FIG. 1 is a schematic figure that shows an overall configuration of the vehicle brake system to which a parking brake control device according to the present embodiment is applied. FIG. 2 is a schematic section view of a rear wheel brake mechanism that is provided in the brake system. The present embodiment will be explained with reference to these drawings.

As shown in FIG. 1, the brake system is provided with a service brake 1 that generates a braking force based on a pedal force of a driver and with an EPB 2 for restricting the movement of the vehicle when it is parked.

For the service brake 1, the pedal force, which corresponds to the extent to which the driver depresses a brake pedal 3, is multiplied by a servo unit 4. A brake fluid pressure that corresponds to the multiplied pedal force is then generated within a master cylinder (hereinafter called the M/C) 5, and the brake fluid pressure is transmitted to a wheel cylinder (hereinafter called the W/C) 6 that is provided in a brake mechanism for each of the wheels, thus generating the braking force. An actuator 7 for controlling the brake fluid pressure is provided between the M/C 5 and the W/Cs 6 and serves as a mechanism that regulates the braking force that is generated by the service brake 1 and performs various types of control (for example, anti-skid control and the like) in order to improve the stability of the vehicle.

The various types of control using the actuator 7 are performed by an Electronic Stability Control (ESC) ECU 8. For example, by outputting a control current in order to control various types of control valves and pump-operating motors that are provided in the actuator 7 and are not shown in the drawings, the ESC ECU 8 controls a hydraulic pressure circuit that is provided in the actuator 7 and controls a W/C pressure that is transmitted to the W/Cs 6. This prevents the wheels from slipping and improves the stability of the vehicle. For example, for each of the individual wheels, the actuator 7 is provided with a pressure-boosting control valve that controls the brake fluid pressure that is applied to the W/C 6, the brake fluid pressure having been one of generated within the M/C 5 and generated by the operation of a pump. The actuator 7 is also provided with a pressure-reducing control valve that reduces the W/C pressure by supplying the brake fluid within each of the W/Cs 6 to a reservoir. The pressure-boosting control valve and the pressure-reducing control valve make the actuator 7 a mechanism that is able to boost, maintain, and reduce the W/C pressure. The configuration of the actuator 7 is a known configuration, so a detailed explanation will be omitted.

In contrast, the EPB 2 generates a braking force by using a motor 10 to control the brake mechanisms. The EPB 2 is configured such that it includes an EPB control device (hereinafter called the EPB ECU) 9 that controls the operation of the motor 10.

The brake mechanisms are mechanical structures that generate the braking force in the brake system according to the present embodiment. The front wheel brake mechanisms are structures that generate the braking force according to the operation of the service brake 1, while the rear wheel brake mechanisms are structures that generate the braking force according to both the operation of the service brake 1 and the operation of the EPB 2. In contrast to the rear wheel brake mechanisms, the front wheel brake mechanisms are brake mechanisms that have been in general use for some time and that lack a mechanism that generates the braking force based on the operation of the EPB 2, so an explanation will be omitted. In the explanation that follows, the rear wheel brake mechanisms will be explained.

In the rear wheel brake mechanism, both when it is operated by the service brake 1 and when it is operated by the EPB 2, pressure is applied to brake pads 11 that are friction-applying members, one of which is shown in FIG. 2, such that the brake pads 11 pinch a brake disc 12 that is a friction-applied member. A friction force is generated between the brake pads 11 and the brake disc 12, thereby generating the braking force.

Basically, the brake mechanism turns the motor 10, which is directly attached to a body 14 of the W/C 6, as shown in FIG. 2, in order to apply the pressure to the brake pads 11 on the inside of a caliper 13 that is shown in FIG. 1. This in turn rotates a spur gear 15 that is provided on a drive shaft 10a of the motor 10, and the rotational force of the motor 10 is transmitted to a spur gear 16 that meshes with the spur gear 15. This moves the brake pads 11, such that the braking force is generated by the EPB 2.

A portion of an edge face of the brake disc 12 is accommodated within the caliper 13, such that it is pinched by the brake pads 11 when the pressure is applied to of the W/C 6 and the brake pads 11. The W/C 6 generates the W/C pressure within a hollow portion 14a that is a brake fluid chamber within the cylindrical body 14 by introducing brake fluid into the hollow portion 14a through a passage 14b. A rotating shaft 17, an impelling shaft 18, a piston 19, and the like are provided within the hollow portion 14a.

One end of the rotating shaft 17 is passed through an insertion hole 14c that is formed in the body 14 and is coupled to the spur gear 16, such that when the spur gear 16 is rotated, the rotating shaft 17 is rotated in conjunction with the rotation of the spur gear 16. At the opposite end of the rotating shaft 17 from the end that is coupled to the spur gear 16, a male threaded groove 17a is formed on the outer circumferential face of the rotating shaft 17. The other end of the rotating shaft 17 is supported by being inserted into the insertion hole 14c. Specifically, a bearing 21 and an O ring 20 are provided in the insertion hole 14c. The O ring 20 prevents the brake fluid from leaking out between the rotating shaft 17 and an inner wall face of the insertion hole 14c, and the bearing 21 supports the end of the rotating shaft 17.

The impelling shaft 18 is configured as a hollow cylindrical member, and a female threaded groove 18a that is threaded together with the male threaded groove 17a of the rotating shaft 17 is formed on an inner wall of the impelling shaft 18. The impelling shaft 18 is formed into one of a circular columnar shape and a polygonal columnar shape and is provided with a key, for example, to prevent it from rotating, such that even if the rotating shaft 17 rotates, the impelling shaft 18 is not rotated around the center of rotation of the rotating shaft 17. Therefore, when the rotating shaft 17 is rotated, the engaging of the male threaded groove 17a and the female threaded groove 18a causes the rotational force of the rotating shaft 17 to be converted into a force that moves the impelling shaft 18 in the axial direction of the rotating shaft 17. When the operation of the motor 10 is stopped, the impelling shaft 18 is stopped in the same position by the friction force that is generated by the engaging of the male threaded groove 17a and the female threaded groove 18a. Thus, when the target braking force is achieved, the impelling shaft 18 can be kept in that position by stopping the operation of the motor 10.

The piston 19 is disposed such that it encloses the outer circumference of the impelling shaft 18, so it is formed as one of a circular cylindrical member and a polygonal cylindrical member that has a bottom, and it is disposed such that its outer circumferential face is in contact with an inner wall face of the hollow portion 14a of the body 14. A seal member 22 is provided on the inner wall face of the body 14, such that leakage of the brake fluid will not occur between the outer circumferential face of the piston 19 and the inner wall face of the body 14, and the piston 19 is structured such that the W/C pressure can be applied to an end face of the piston 19. Furthermore, in a case where the impelling shaft 18 is provided with a key to prevent it from rotating, such that even if the rotating shaft 17 rotates, the impelling shaft 18 is not rotated around the center of rotation of the rotating shaft 17, the piston 19 is provided with a key slot in which the key slides, and in a case where the impelling shaft 18 has a polygonal columnar shape, the piston 19 has a corresponding polygonal cylindrical shape.

The brake pad 11 is disposed on the end of the piston 19 and is moved to the left and to the right in FIG. 2 in conjunction with the movement of the piston 19. Specifically, the piston 19 is configured such that it can move to the left in FIG. 2 in conjunction with the movement of the impelling shaft 18, and when the W/C pressure is applied to the ends of the piston 19 (the end where the brake pad 11 is disposed and the opposite end), the piston 19 can move to the left in FIG. 2 independently of the impelling shaft 18. Moreover, when the impelling shaft 18 is in its initial position (the state it is in before the motor 10 rotates it), if the brake fluid pressure is not being applied within the hollow portion 14a (the W/C pressure is zero), elastic deformation of the piston seal 22 moves the piston 19 to the right in FIG. 2, such that the brake pad 11 is separated from the brake disc 12. Further, when the W/C pressure drops to zero when the motor 10 is operated and the impelling shaft 18 is moved to the right in FIG. 2 from its initial position, the movement of piston 19 to the right in FIG. 2 is restricted by the moved impelling shaft 18, so the brake pad 11 is kept in that position.

In the brake mechanism that is thus configured, when the service brake 1 is operated, the piston 19 is moved to the left in FIG. 2, based on the W/C pressure that is thus generated, such that the brake pads 11 are pressed against the brake disc 12, generating the braking force. Furthermore, when the EPB 2 is operated, the spur gear 15 is rotated by the operating of the motor 10, such that the spur gear 16 and the rotating shaft 17 are also rotated, so the impelling shaft 18 is moved toward the brake disc 12 (toward the left in FIG. 2), based on the engaging of the male threaded groove 17a and the female threaded groove 18a. At the same time, the piston 19 is also moved in the same direction, such that the brake pads 11 are pressed against the brake disc 12, and the braking force is generated. It is therefore possible for the brake mechanism to generate the braking force in relation to both the operation of the service brake 1 and the operation of the EPB 2.

Furthermore, if the EPB 2 is operated when the brake mechanism is in a state in which the W/C pressure is being generated by the operating of the service brake 1, the piston 19 has already been moved to the left in FIG. 2 by the W/C pressure, so the load on the impelling shaft 18 is reduced. Therefore, the motor 10 is operated in an almost unloaded state until the impelling shaft 18 comes into contact with the piston 19. Then, when the impelling shaft 18 comes into contact with the piston 19, a pressing force is applied that pushes the piston 19 to the left in FIG. 2, such that the braking force comes to be generated by the EPB 2.

The EPB ECU 9 is configured from a known microcomputer that is provided with a CPU, a ROM, a RAM, an I/O, and the like, and it performs parking brake control by controlling the operation of the motor 10 in accordance with a program that is stored in the ROM or the like. The EPB ECU 9 is equivalent to the parking brake control device of the present invention. The EPB ECU 9 may input a signal or the like that corresponds to an operating state of an operation switch (SW) 23 that is provided on an instrument panel (not shown in the drawings) within the vehicle cabin, for example, and may operate the motor 10 in accordance with the operating state of the operation SW 23. The EPB ECU 9 also outputs, to a locked/released display lamp 24 that is provided on the instrument panel, a signal that indicates whether the parking brake is locked or released.

Specifically, the EPB ECU 9 includes a motor current detection portion that detects, on one of an upstream side and a downstream side of the motor 10, an electric current (a motor current) that flows in the motor 10, a target motor current computation portion that computes a target motor current (a target current value) when the locking control is terminated, and various types of functional portions for performing locking control and releasing control, such as a determination as to whether or not the motor current has reached the target motor current, a control of the motor 10 that is based on the operating state of the operation SW 23, and the like. The EPB ECU 9 performs the locking control and the releasing control of the EPB 2 by turning the motor 10 in a forward direction, turning the motor 10 in reverse, and stopping the rotation of the motor 10, based on the state of the operation SW 23 and on the motor current.

Figure 3:
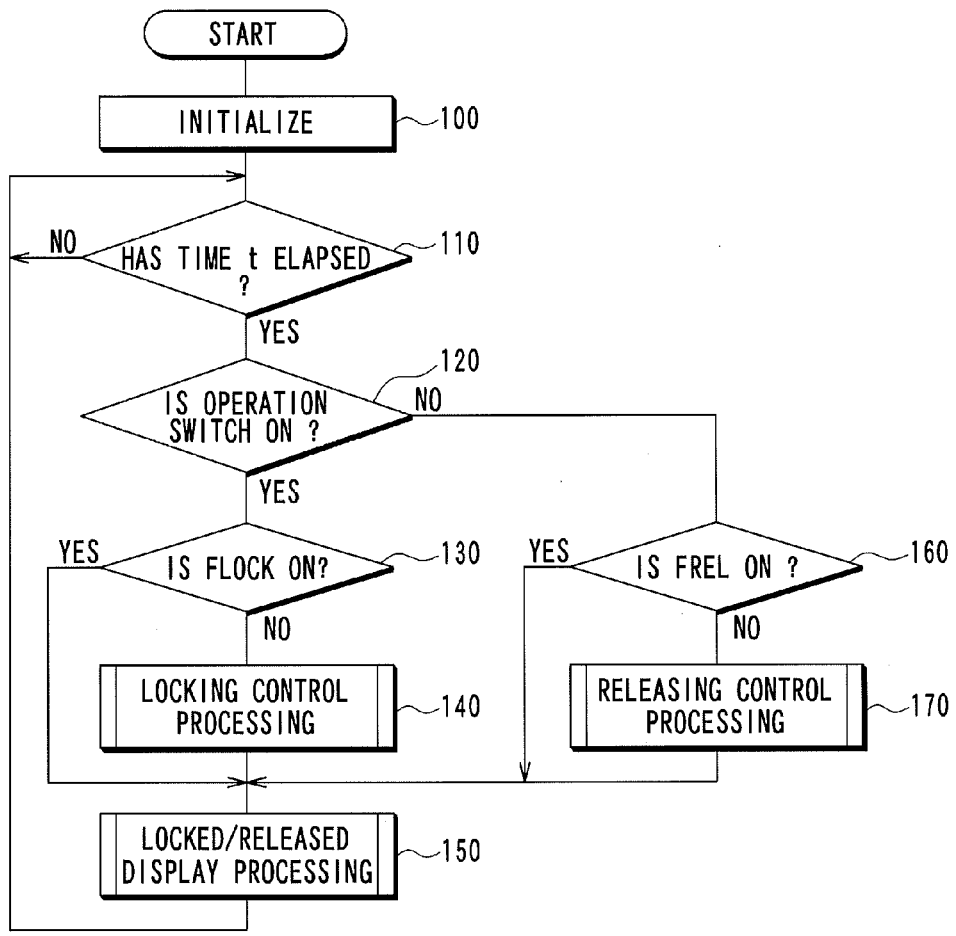
FIG. 3 is a flowchart that shows details of parking brake control processing.

Next, the parking brake control will be explained that the EPB ECU 9 performs through the various types of functional portions that are described above in accordance with a program that is stored in an internal ROM that is not shown in the drawings, using the brake system that is configured as described above. FIG. 3 is a flowchart that shows details of parking brake control processing.

First, ordinary initialization processing such as resetting a time measurement counter, a flag, and the like is performed at Step 100, after which the processing advances to Step 110 and determines whether or not a time t has elapsed. The time t defines a control cycle. In other words, the determination at Step 110 is repeatedly performed until one of the time that has elapsed since the initialization processing was completed and the time that has elapsed since the last time that it was determined at Step 110 that the time t had elapsed equals the time t, such that the parking brake control device is performed every time that the time t elapses.

Next, at Step 120, a determination is made as to whether or not the operation SW 23 is on. A state in which the operation SW 23 is on means that the driver has operated the EPB 2 to put it into the locked state, and a state in which the operation SW 23 is off means that the driver has put the EPB 2 into the released state. Therefore, if the operation SW 23 is on at Step 120, the processing advances to Step 130, where a determination is made as to whether or not a locked state flag FLOCK has been set to on. The locked state flag FLOCK is a flag that is set to on when the EPB 2 is operated and put into the locked state, so when the locked state flag FLOCK has been set to on, a state exists in which the operation of the EPB 2 has been completed and the desired braking force has been generated. Therefore, in a case where the locked state flag FLOCK has not been set to on at Step 130, the processing advances to locking control processing at Step 140, and in a case where the locked state flag FLOCK has been set to on at Step 130, the locking control processing has already been completed, so the processing advances to Step 150.

Figure 4:
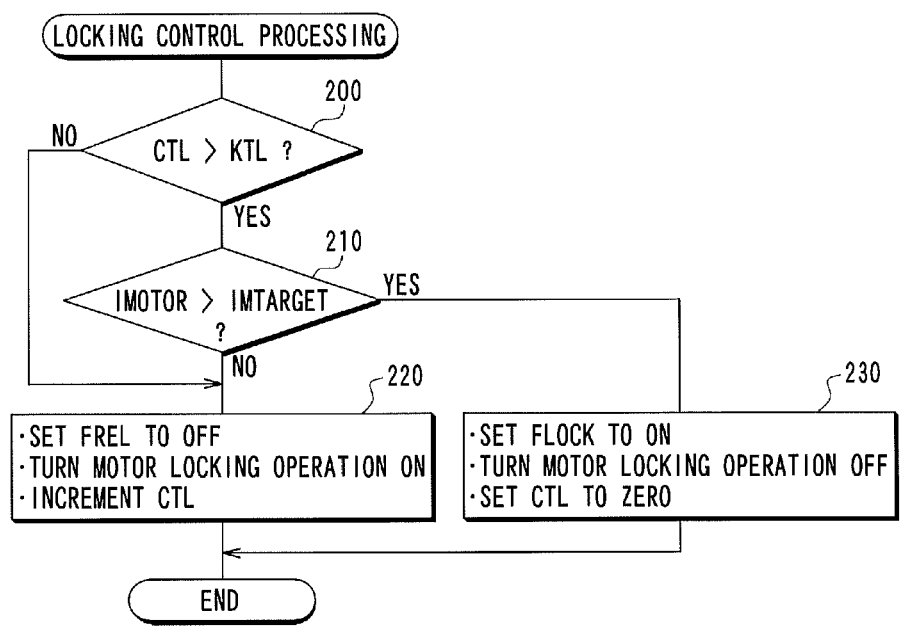
FIG. 4 is a flowchart that shows details of locking control processing.

In the locking control processing, processing is performed that operates the EPB 2 by turning the motor 10, that stops the motor 10 in the position where the desired braking force has been generated by the EPB 2, and that maintains that state. A flowchart that shows details of the locking control processing is shown in FIG. 4, and the locking control processing will be explained with reference to FIG. 4.

First, at Step 200, a determination is made as to whether or not a locking control time counter CTL is greater than a minimum locking control time KTL that has been set in advance. The locking control time counter CTL is a counter that measures the time that has elapsed since the locking control was started, and it starts counting at the same time that the locking control is started. The minimum locking control time KTL is the minimum time that is assumed to be required for the locking control (for example, 200 milliseconds), and it is a value that is determined in advance in accordance with the revolution speed of the motor 10 and the like. When a motor current IMOTOR has reached a target motor current IMTARGET, a determination is made, as at Step 210, which will be described later, that the braking force that is generated by the EPB 2 has one of reached and approached the desired value, but it is possible that the motor current IMOTOR will exceed the target motor current IMTARGET, due to a rush current or the like when the supplying of the current to the motor 10 is initiated. Therefore, comparing the locking control time counter CTL to the minimum locking control time KTL can mask the time when the control is initiated and makes it possible to prevent an erroneous determination from being made due to the rush current or the like.

Therefore, if a state exists in which the locking control time counter CTL has not exceeded the minimum locking control time KTL, the locking control will still be continued, so the processing advances to Step 220, where a released state flag FREL is set to off, the locking control time counter CTL is incremented, and a motor locking operation is turned on, that is, the motor 10 is turned in the forward direction. Thus the spur gear 15 is rotated in conjunction with the forward rotation of the motor 10, the spur gear 16 and the rotating shaft 17 rotate, and the impelling shaft 18 is moved toward the brake disc 12, based on the engaging of the male threaded groove 17a and the female threaded groove 18a. The piston 19 is also moved in the same direction, such that the brake pad 11 moves toward the brake disc 12.

On the other hand, if the locking control time counter CTL has exceeded the minimum locking control time KTL at Step 200, the processing advances to Step 210, where a determination is made as to whether or not the motor current IMOTOR has exceeded the target motor current IMTARGET in the current control cycle. The motor current IMOTOR fluctuates according to the load that is imposed on the motor 10, but in the present embodiment, the load that is imposed on the motor 10 is equivalent to the pressing force that presses the brake pad 11 against the brake disc 12, so the motor current IMOTOR is a value that corresponds to the pressing force. Therefore, if the motor current IMOTOR has exceeded the target motor current IMTARGET, a state exists in which the desired braking force has been generated by the generated pressing force. In other words, a state exists in which the EPB 2 is pressing a friction face of the brake pad 11 against a wall face of the brake disc 12 with a certain force. Accordingly, the processing at Step 220 is repeatedly performed until the motor current IMOTOR is greater than the target motor current IMTARGET at Step 210, and once the motor current IMOTOR is greater than the target motor current IMTARGET, the processing advances to Step 230.

Next, at Step 230, the locked state flag FLOCK is set to on, meaning that the locking has been completed, the locking control time counter CTL is set to zero, and the motor locking operation is turned off (stopped). This causes the rotation of the motor 10 to be stopped and the rotation of the rotating shaft 17 to be stopped, while the friction force that is due to the engaging of the male threaded groove 17a and the female threaded groove 18a keeps the impelling shaft 18 in the same position, so the braking force that is generated at that time is maintained. The movement of the parked vehicle is thus restricted. the locking control processing is then terminated.

In contrast, if the operation SW 23 is not on at Step 120, the processing advances to Step 160, and a determination is made as to whether or not the released state flag FREL has been set to on. The released state flag FREL is a flag that is set to on when the EPB 2 is operated and put into the released state, that is, the state in which the braking force has been released by the EPB 2, so when the locked state flag FLOCK has been set to on, a state exists in which the operation of the EPB 2 has been completed and the braking force has been released. Therefore, in a case where the released state flag FREL has not been set to on at Step 160, the processing advances to releasing control processing at Step 170, and in a case where the released state flag FREL has been set to on at Step 160, the releasing control processing has already been completed, so the processing advances to Step 150.

Figure 5:
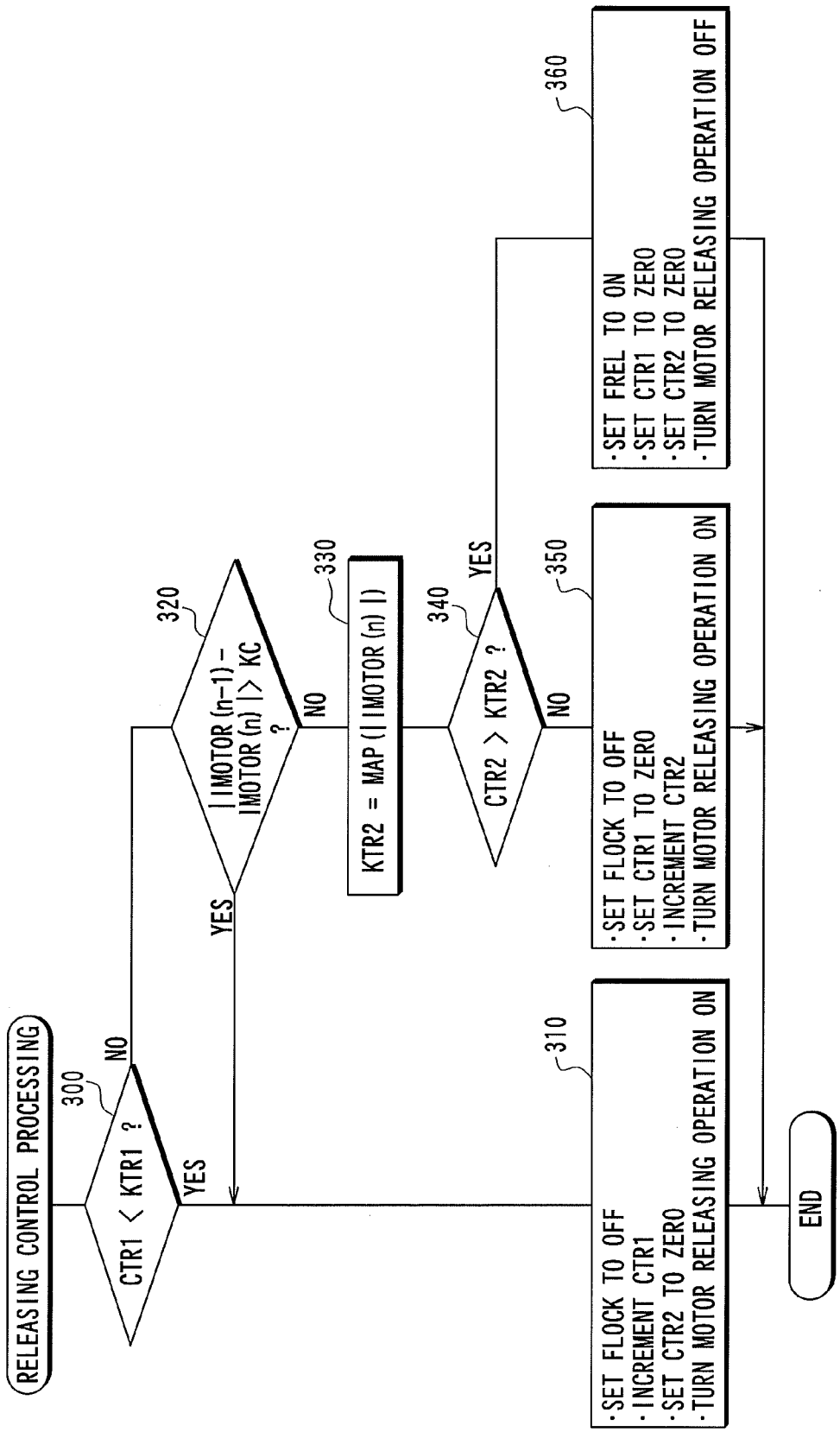
FIG. 5 is a flowchart that shows details of releasing control processing.

In the releasing control processing, processing is performed that operates the EPB 2 by turning the motor 10, and that releases the braking force that has been generated by the EPB ECU 9. A flowchart that shows details of the releasing control processing is shown in FIG. 5, and the releasing control processing will be explained with reference to FIG. 5.

First, at Step 300, a determination is made as to whether or not a first releasing control time counter CTR1 is greater than a minimum releasing operation time KTR1 that has been set in advance. The releasing control time counter CTR1 is a counter that measures the time that has elapsed since the releasing control was started, and it starts counting at the same time that the releasing control is started. The minimum releasing operation time KTR1 is the minimum time that is assumed to be required for the releasing control (for example, 200 milliseconds), and it is a value that is determined in advance in accordance with the revolution speed of the motor 10 and the like. When a determination is made, as at Step 320, which will be described later, that the braking force has dropped to zero, based on the difference between a motor current IMOTOR (n−1) that was detected during the preceding control cycle and a motor current IMOTOR (n) that has been detected during the current control cycle, that is, based on the absolute value of a differential value of the motor current IMOTOR, it is possible that the absolute value will satisfy a condition for determining that the braking force has dropped to zero, due to the rush current or the like when the supplying of the current to the motor 10 is initiated. Therefore, comparing the first releasing control time counter CTR1 to the minimum releasing operation time KTR1 can mask the time when the control is initiated and makes it possible to prevent an erroneous determination from being made due to the rush current or the like.

Therefore, if a state exists in which the first releasing control time counter CTR1 is less than the minimum releasing operation time KTR1, the releasing control will still be continued, so the processing advances to Step 310, where the locked state flag FLOCK is set to off, the first releasing control time counter CTR1 is incremented, and a motor releasing operation is turned on, that is, the motor 10 is turned in the reverse direction. Thus the rotating shaft 17 is rotated in conjunction with the reverse rotation of the motor 10, and the impelling shaft 18 is moved in the direction that separates it from the brake disc 12, based on the friction force that is generated by the engaging of the male threaded groove 17a and the female threaded groove 18a. The piston 19 and the brake pad 11 are also moved in the same direction.

On the other hand, if it is determined at Step 300 that the first releasing control time counter CTR1 is not less than the minimum releasing operation time KTR1, the processing advances to Step 320. There, a determination is made as to whether or not the absolute value of the difference between the motor current IMOTOR (n−1) that was detected during the preceding control cycle and the motor current IMOTOR (n) that has been detected during the current control cycle exceeds a threshold value KC. As described previously, the motor current IMOTOR is a value that corresponds to the pressing force that has been generated. The pressing force is decreased by the releasing control's moving of the brake pad 11 in the direction that separates it from the brake disc 12, so the absolute value of the motor current IMOTOR gradually decreases. At this time, if the motor current IMOTOR that flows when the motor 10 is turned in the reverse direction is expressed as a negative value, the motor current IMOTOR gradually increases. Therefore, a determination is made as to whether or not the motor load is changing by determining the absolute value of the difference between the motor current IMOTOR (n−1) and the motor current IMOTOR (n). Accordingly, taking into account noise that may cause an erroneous determination, the threshold value KC is set to a value that is not greater than the amount of change in the motor current IMOTOR that is assumed to occur because of changes in the motor load that are due to the releasing control. When the absolute value of the difference between the motor current IMOTOR (n−1) and the motor current IMOTOR (n) becomes no greater than the threshold value KC, a determination is made that there is no motor load and that the braking force has dropped to zero.

Therefore, the processing at Step 310 continues to be performed repeatedly until the absolute value of the difference between the motor current IMOTOR (n−1) and the motor current IMOTOR (n) becomes no greater than the threshold value KC at Step 320, and when the absolute value of the difference between the motor current IMOTOR (n−1) and the motor current IMOTOR (n) becomes no greater than the threshold value KC at Step 320, the processing advances to Step 330.

At Step 330, a second releasing operation time KTR2 is computed based on the motor current IMOTOR (n) that has been detected during the current control cycle. The braking force has dropped to zero in the current control cycle, so the motor current IMOTOR (n) that has been detected during the current control cycle is the motor current IMOTOR that corresponds to a motor load that is assumed to be almost nonexistent, and the value of the motor current IMOTOR (n) expresses fluctuations in the motor load that are due to temperature changes or the like. Therefore, the second releasing operation time KTR2, which is the time from when the braking force drops to zero until the operation of the motor 10 is stopped, is determined based on the absolute value of the motor current IMOTOR (n) that has been detected during the current control cycle (|IMOTOR (n)|).

Figure 6:
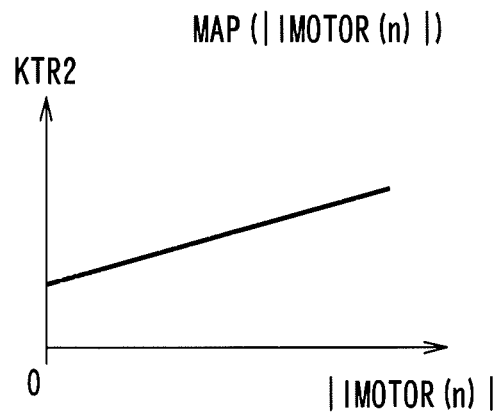
FIG. 6 is a map that shows a relationship between an absolute value (|IMOTOR (n)|) of a motor current IMOTOR (n) and a second releasing operation time KTR2.

For example, the second releasing operation time KTR2 can be computed using one of a map that is shown in FIG. 6 of the relationship between the absolute value of the motor current IMOTOR (n) (|IMOTOR (n)|) and the second releasing operation time KTR2 and a function formula that corresponds to the map. Specifically, as shown in FIG. 6, the greater the absolute value of the motor current IMOTOR (n) (|IMOTOR (n)|) becomes, the greater the second releasing operation time KTR2 becomes. This is because it is thought that the motor load that arises due to fluctuations increases, and the motor revolution speed decreases, as the absolute value of the motor current IMOTOR (n) (|IMOTOR (n)|) becomes greater.

Therefore, the second releasing operation time KTR2 is set to a longer time as the absolute value of the motor current IMOTOR (n) (|IMOTOR (n)|) becomes greater, such that the time from when the braking force drops to zero until the operation of the motor 10 is stopped becomes longer. Therefore, even if the motor revolution speed decreases because the motor load is high, the motor operating time can be lengthened accordingly, so it is possible to ensure the clearance between the brake pads 11 and the brake disc 12.

Next, the processing advances to Step 340, where a determination is made as to whether or not a second releasing control time counter CTR2 that is a counter that measures the time that has elapsed since the braking force dropped to zero has exceeded the second releasing operation time KTR2. If the second releasing control time counter CTR2 has not exceeded the second releasing operation time KTR2, the processing advances to Step 350, where the locked state flag FLOCK is set to off, the first releasing control time counter CTR1 is set to zero, the second releasing control time counter CTR2 is incremented, and the motor releasing operation is turned on, that is, the motor 10 is turned in the reverse direction. Thus the operation is performed in the same manner as at Step 310, and the brake pad 11 is separated from the brake disc 12.

If it is determined at Step 340 that the second releasing control time counter CTR2 has exceeded the second releasing operation time KTR2, the processing advances to Step 360, where the released state flag FREL is set to on, which means that the releasing has been completed, the first and the second releasing control time counters CTR1, CTR2 are set to zero, and the motor releasing operation is turned off. Therefore, the turning of the motor 10 is stopped, and the friction force that is generated by the engaging of the male threaded groove 17a and the female threaded groove 18a keeps the brake pad 11 in the state of being separated from the brake disc 12. The releasing control processing is thus completed.

Note that the processing that performs the computation of the second releasing operation time KTR2 that is shown at Step 330 in FIG. 5 is repeatedly performed in each computation cycle after it has been determined at Step 320 that the absolute value of the difference between the motor current IMOTOR (n−1) and the motor current IMOTOR (n) is not greater than the threshold value KC. Accordingly, even if the motor current IMOTOR fluctuates temporarily while the clearance between the brake pad 11 and the brake disc 12 is becoming greater after the braking force has dropped to zero, the second releasing operation time KTR2 will be changed according to that fluctuation. Therefore, the second releasing operation time KTR2 can be changed even in response to a motor load fluctuation that is caused by a temperature change or the like that is caused by the motor operation, for example, such that the clearance between the brake pad 11 and the brake disc 12 can be kept constant.

Figure 7:
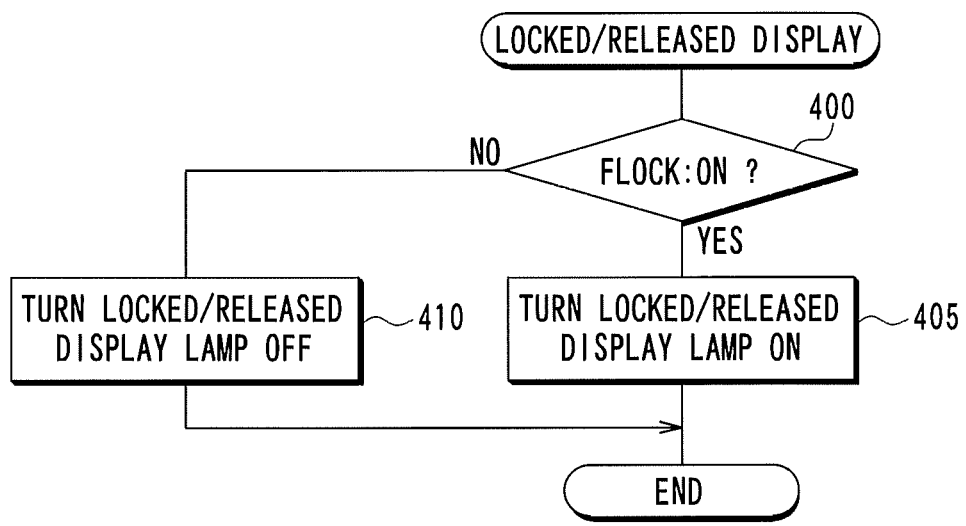
FIG. 7 is a flowchart that shows details of locked/released display processing.

When the locking control processing and the releasing control processing have been completed, locked/released display processing is performed at Step 150 in FIG. 3. A flowchart that shows details of the locked/released display processing is shown in FIG. 7, and the locked/released display processing will be explained with reference to FIG. 7.

At Step 400, a determination is made as to whether or not the locked state flag FLOCK has been set to on. If it is determined that the locked state flag FLOCK has been set to on, the processing advances to Step 405, where the locked/released display lamp 24 is turned on, and if it is determined that the locked state flag FLOCK has not been set to on, the processing advances to Step 410, where the locked/released display lamp 24 is turned off. Thus the locked/released display lamp 24 is turned on if the brake mechanism is in the locked state, and the locked/released display lamp 24 is turned off when one of the brake mechanism is in the released state and the releasing control has been started. This makes it possible to make the driver aware of whether or not the brake mechanism is in the locked state. With that, the locked/released display processing is completed, in conjunction with which the parking brake control processing is completed.

Figure 8:
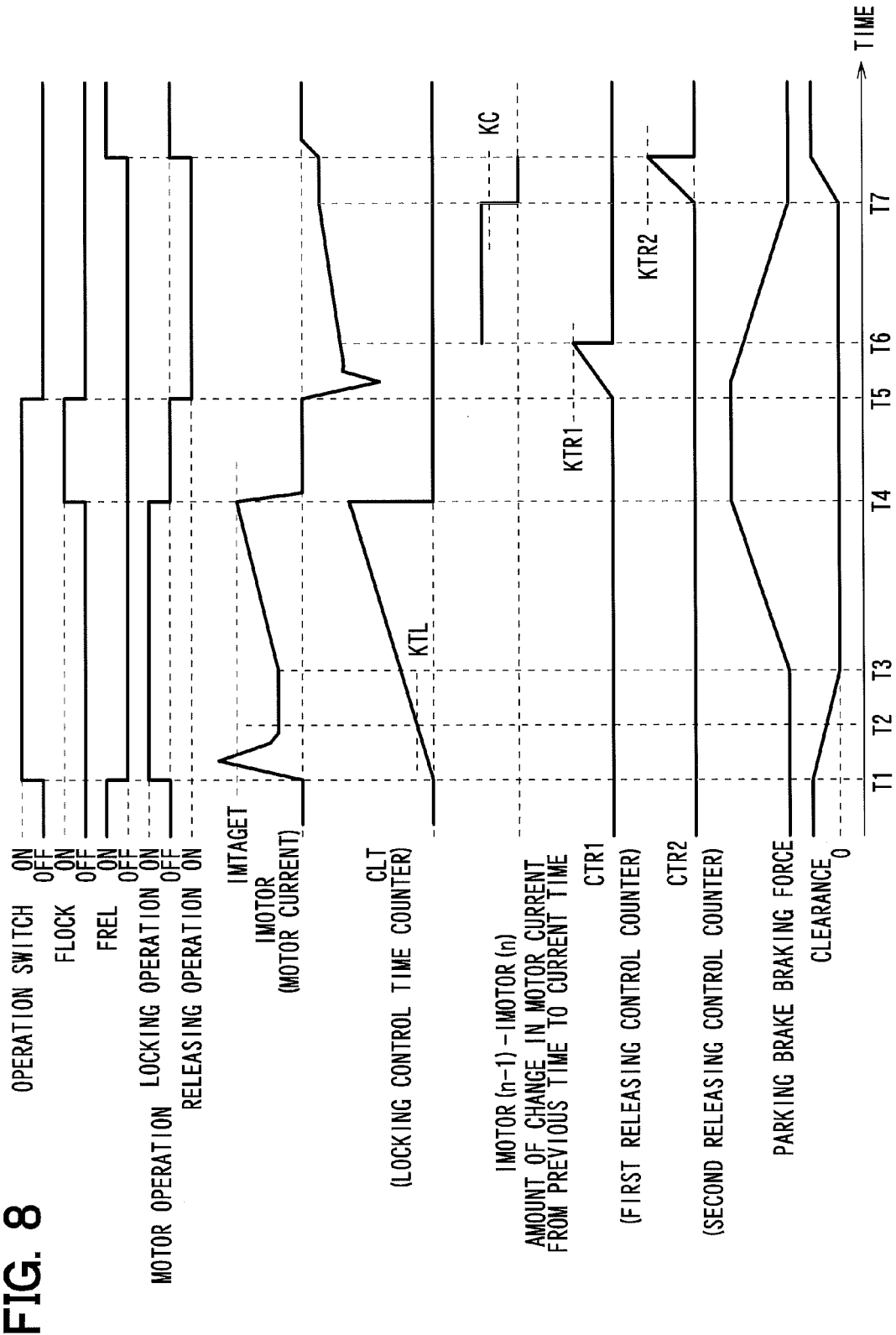
FIG. 8 is a timing chart for when the parking brake control processing is performed.

FIG. 8 is a timing chart for when the parking brake control processing is performed. As shown in FIG. 8, when the operation SW 23 is turned on and the locking operation is started at a time T1, the motor locking operation is turned on, the motor 10 is turned in the forward direction, and the impelling shaft 18 is moved toward the brake pad 11. At the same time, the released state flag FREL is set to off.

Next, at a time T2, the locking operation is continued until the minimum locking control time KTL has elapsed, irrespective of the value of the motor current IMOTOR, so the locking operation is continued even if the rush current is generated. Next, after the minimum locking control time KTL has elapsed, when the brake pad 11 and the brake disc 12 come into contact at a time T3 and the clearance between them becomes zero, the braking force is generated. A load on the motor 10 is thus generated, so the motor current IMOTOR increases, and when the motor current IMOTOR reaches the target motor current IMTARGET at a time T4, the motor locking operation is stopped. At the same time, the locked state flag FLOCK is set to on.

In this manner, the locking control is performed, and the desired braking force is generated by the pressing of the brake pad 11 against the brake disc 12.

Next, at a time T5, when the operation SW 23 is turned off and the releasing control is started, the motor releasing operation is turned on, the motor 10 is turned in the reverse direction, and the impelling shaft 18 moves the brake pad 11 such that it separates from the brake disc 12. At the same time, the locked state flag FLOCK is set to off.

Next, the releasing operation is continued until the minimum releasing operation time KTR1 has elapsed, irrespective of the value of the motor current IMOTOR, so the releasing operation is continued even if the rush current is generated. Next, after the minimum releasing operation time KTR1 has elapsed at a time T6, when the absolute value of the difference between the motor current IMOTOR (n−1) that was detected during the preceding control cycle and the motor current IMOTOR (n) that has been detected during the current control cycle becomes no greater than the threshold value KC at a time T7, the braking force is deemed to have dropped to zero, and the motor operation is continued until the second releasing operation time KTR2 has elapsed. the brake pad 11 thus separates from the brake disc 12, and the clearance between them is widened. Thereafter, when the second releasing operation time KTR2 has elapsed, the motor releasing operation is stopped. At the same time, the released state flag FREL is set to on.

In this manner, the releasing control is performed, the clearance between the brake pad 11 and the brake disc 12 is kept constant, and the required amount of clearance is ensured.

As has been explained above, in the present embodiment, when the releasing control is performed, the timing at which the braking force that is generated by the EPB 2 drops to zero is detected based on the change in the motor current IMOTOR, and the second releasing operation time KTR2 is set in accordance with the magnitude of the motor current IMOTOR at the time that the braking force drops to zero. This makes it possible to set the second releasing operation time KTR2 in accordance with the fluctuations in the motor load that are due to temperature changes or the like.

Therefore, the clearance between the brake pad 11 and the brake disc 12 can be kept constant in accordance with the motor load. This keeps the clearance between the brake pad 11 and the brake disc 12 constant with better accuracy and makes it possible to provide the parking brake control device that includes the EPB 2 that can perform more precise releasing control.

Second Embodiment

A second embodiment of the present invention will be explained. In the present embodiment, the configuration of the brake system and the method of the releasing control processing are modified from what they were in the first embodiment, but the present embodiment is otherwise the same as the first embodiment, so only the portions that are different from the first embodiment will be explained.

In a case where the braking force is generated only by the EPB 2, it is acceptable to take into consideration the braking force of only the EPB 2, as in the first embodiment, but in a case where the braking force is generated by the driver's depressing of the brake pedal 3, it is preferable for the effect of the driver's depressing of the brake pedal 3 to be taken into account in the performing of the releasing control. Accordingly, in the present embodiment, the releasing control that is performed is also compatible with a case in which the driver is depressing the brake pedal 3.

Figure 9:
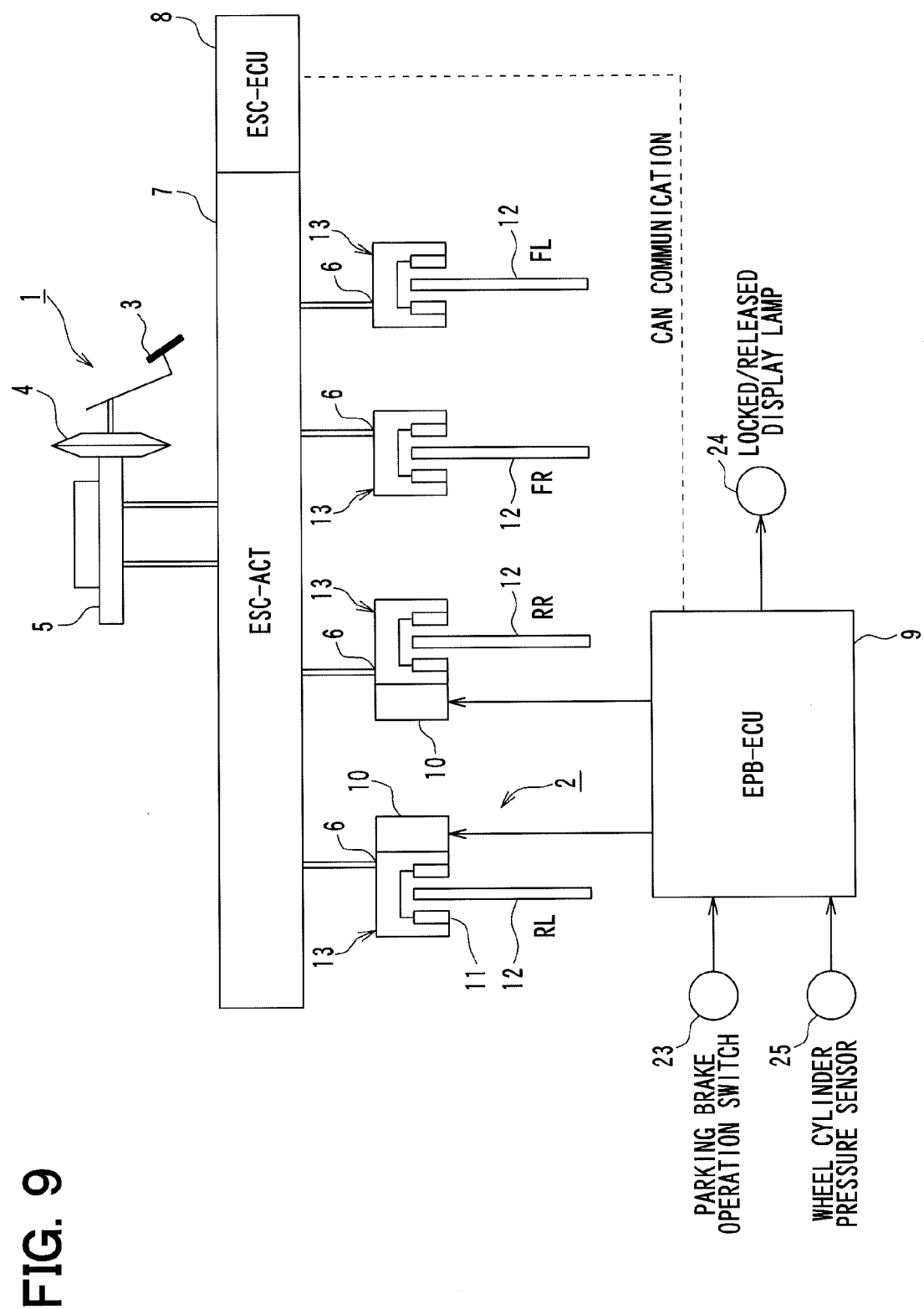
FIG. 9 is a schematic figure that shows an overall configuration of a vehicle brake system to which a parking brake control device according to a second embodiment of the present invention is applied.

FIG. 9 is a schematic figure that shows an overall configuration of a vehicle brake system to which a parking brake control device according to the present embodiment is applied. As shown in FIG. 9, a detection signal is input to the EPB ECU 9 from a W/C pressure sensor 25 that is equivalent to a pressure detection means, and in the locking and releasing control by the EPB 2, the motor operation is performed in accordance with the W/C pressure and the operating state of the operation SW 23.

Figure 10:
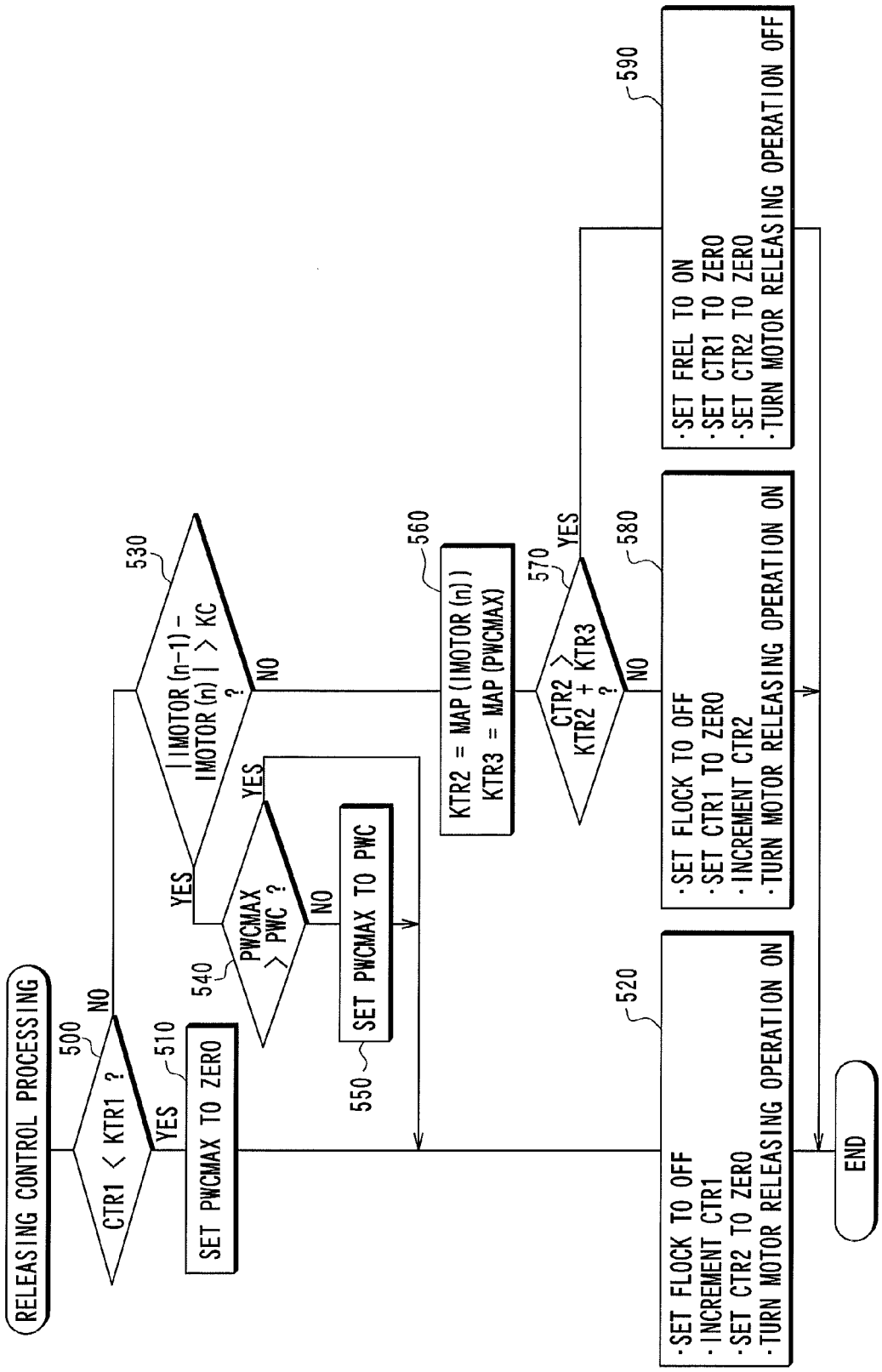
FIG. 10 is a flowchart that shows details of releasing control processing.

FIG. 10 is a flowchart that shows details of the releasing control processing. As shown in FIG. 10, first, in the same manner as at Step 300 in FIG. 5, a determination is made at Step 500 as to whether or not the first releasing control time counter CTR1 is greater than the minimum releasing operation time KTR1 that has been set in advance. If the first releasing control time counter CTR1 is greater than the minimum releasing operation time KTR1, the processing advances to Step 510, where a maximum W/C pressure value PWCMAX that will be described later is set to zero, after which the processing advances to Step 520, where the same processing as at Step 310 in FIG. 5 is performed.

On the other hand, if the first releasing control time counter CTR1 is not greater than the minimum releasing operation time KTR1, the processing advances to Step 530, where, in the same manner as at Step 320 in FIG. 5, a determination is made as to whether or not the absolute value of the difference between the motor current IMOTOR (n−1) during the preceding control cycle and the motor current IMOTOR (n) during the current control cycle exceeds the threshold value KC. If the absolute value of the difference between the motor current IMOTOR (n−1) and the motor current IMOTOR (n) does exceed the threshold value KC, the processing advances to Step 540, where a determination is made as to whether or not the currently stored maximum W/C pressure value PWCMAX is greater than a W/C pressure PWC in the current control cycle. At this time, if the currently stored maximum W/C pressure value PWCMAX is greater than the W/C pressure PWC in the current control cycle, the processing advances to Step 520 without updating the currently stored maximum W/C pressure value PWCMAX, but if the W/C pressure PWC in the current control cycle is greater than the currently stored maximum W/C pressure value PWCMAX, the processing advances to Step 550, where the currently stored maximum W/C pressure value PWCMAX is updated to the W/C pressure PWC.

Here, the maximum W/C pressure value PWCMAX is the maximum value of the W/C pressure that is generated while the releasing control is being performed. It driver depresses the brake pedal 3 while the releasing control is being performed, the portion of the braking force that corresponds to the W/C pressure that is generated by the depressing of the brake pedal 3 remains, even if a determination is made that the braking force has dropped to zero, based on the absolute value of the difference between the motor current IMOTOR (n−1) during the preceding control cycle and the motor current IMOTOR (n) during the current control cycle. It is therefore preferable for the motor operation time to be lengthened in accordance with the generated W/C pressure. However, in a case where the driver depresses the brake pedal 3 repeatedly, it is preferable for the motor operation time to be set in accordance with the W/C pressure at the time that the W/C pressure reaches its maximum value (the maximum W/C pressure value PWCMAX).

Therefore, at Step 550, the maximum value of the generated W/C pressure is stored as the maximum W/C pressure value PWCMAX until a determination is made that the braking force has dropped to zero.

Then, when it is determined at Step 530 that the absolute value of the difference between the motor current IMOTOR (n−1) during the preceding control cycle and the motor current IMOTOR (n) during the current control cycle has become no greater than the threshold value KC, the processing advances to Step 560, where the second releasing operation time KTR2 is computed in the same manner as at Step 330 in FIG. 5, and a third releasing operation time KTR3 is also computed.

The third releasing operation time KTR3 is an additional time by which the motor releasing operation time is extended in accordance with the W/C pressure that is generated in accordance with the depressing of the brake pedal 3 by the driver. In other words, the W/C pressure that is generated in accordance with the depressing of the brake pedal 3 by the driver is factored into the releasing operation time by adding the third releasing operation time KTR3 to the second releasing operation time KTR2, which is the motor releasing operation time that is set in accordance with the motor load.

Figure 11:
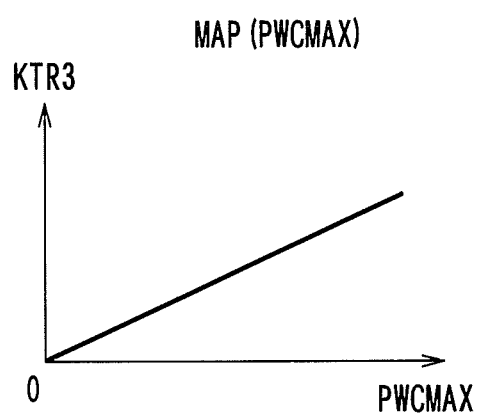
FIG. 11 is a map that shows a relationship between a maximum wheel cylinder pressure value PWCMAX and third releasing operation time KTR3.

For example, the third releasing operation time KTR3 can be computed using one of a map that is shown in FIG. 11 of the relationship between the maximum W/C pressure value PWCMAX and the third releasing operation time KTR3 and a function formula that corresponds to the map. Specifically, as shown in FIG. 11, the greater the maximum W/C pressure value PWCMAX becomes, the greater the third releasing operation time KTR3 becomes. This is because, as the maximum W/C pressure value PWCMAX becomes greater, the motor 10 is operated for a correspondingly longer time, making it possible to prevent the clearance from being insufficient.

Therefore, the third releasing operation time KTR3 is set to a longer time as the maximum W/C pressure value PWCMAX becomes greater, such that the time from when the braking force drops to zero until the motor operation is stopped becomes even longer. Therefore in addition to a case in which the motor revolution speed is reduced in order to increase the motor load, if the W/C pressure is generated by the depressing of the brake pedal 3 by the driver, the motor operation time can be correspondingly lengthened, making it possible to ensure the clearance between the brake pad 11 and the brake disc 12. Furthermore, even in a case where the brakes are pumped, the motor releasing operation time is set based on the maximum W/C pressure value PWCMAX, which is the maximum value of the W/C pressure while the releasing control is being performed, so it is possible to prevent the clearance between the brake pad 11 and the brake disc 12 from being insufficient and to prevent the driver from being given the feeling that the brake is dragging.

Other Embodiments

In the first and second embodiments, when the absolute value of the difference between the motor current IMOTOR (n−1) and the motor current IMOTOR (n) has become no greater than the threshold value KC, the determination is made that there is no motor load and that the braking force has dropped to zero. This is because the sign of the electric current value is positive for the motor current that flows when the motor 10 is turned in the forward direction and is negative for the motor current that flows when the motor 10 is turned in the reverse direction. Therefore, if the current is expressed as a positive value in both cases, it is acceptable to determine that the braking force has dropped to zero when the absolute value of the difference between the motor current IMOTOR (n−1) and the motor current IMOTOR (n) has become no greater than the threshold value KC. Conversely, even if the signs of the electric current value are opposite in the respective cases, it is acceptable to determine that the braking force has dropped to zero when the difference between the motor current IMOTOR (n−1) and the motor current IMOTOR (n) is within the range of ±KC. In effect, both of these cases are covered by a method that determines that the braking force has dropped to zero when the absolute value of the difference between the motor current IMOTOR (n−1) and the motor current IMOTOR (n) has become no greater than the threshold value KC.

In the second embodiment that is described above, a case was explained in which the W/C pressure sensor 25 detects the W/C pressure, but the M/C pressure may also be used instead of the W/C pressure sensor 25, and it may be inferred from the amount that the brake pedal 3 is operated (the pedal force and the stroke).

Furthermore, in each of the embodiments that are described above, a case was explained in which the brake configuration is such that the EPB 2 utilizes the pressurizing function of the service brake 1, as shown in FIG. 2, so the motor output is decreased when the parking brake is applied. However, this is merely one example, and the present invention may also be applied to a brake configuration in which the service brake 1 and the EPB 2 are completely separated.

Additionally, in each of the embodiments that are described above, an example was given in which the EPB 2 is a disc brake, but the EPB 2 may also be a different type, such as a drum brake, for example. In that case, the friction-applying member and the friction-applied member would be the brake shoe and the brake drum, respectively.

Note that the steps that are shown in the various drawings correspond to means that perform the various types of processing. In other words, within the EPB ECU 9, a portion that performs the locking control processing at Step 140 is equivalent to a locking control means, a portion that performs the releasing control processing at Step 170 is equivalent to a releasing control means, a portion that performs the processing at Steps 320 and 530 is equivalent to a determination means, a portion that sets the second releasing operation time KTR2 at Steps 330 and 560 is equivalent to an operation time setting means, and a portion that stops the motor operation at Steps 340, 360, 570, and 590 is equivalent to an operation stopping means.

REFERENCE SIGNS LIST

1 . . . service brake, 2 . . . EPB, 5 . . . M/C, 6 . . . W/C, 7 . . . ESC actuator, 8 . . . ESC-ECU, 9 . . . EPB-ECU, 10 . . . motor, 11 . . . brake pad, 12 . . . brake disk, 13 . . . caliper, 14 . . . body, 14*a* . . . hollow portion, 14*b* . . . passage, 17 . . . rotating shaft, 17*a* . . . male threaded groove, 18 . . . impelling shaft, 18*a* . . . female threaded groove, 19 . . . piston, 23 . . . operation switch, 24 . . . locked/released display lamp, 25 . . . W/C pressure sensor

The invention claimed is:

1. A parking brake control device that includes
   a locking control means that, by operating a motor such that it rotates in a forward direction, moves a friction-applying member in a direction toward a friction-applied member that is attached to a wheel, causing a braking force to be generated by a parking brake, and thereafter stops the operating of the motor and maintains the braking force, and
   a releasing control means that, by operating the motor such that it rotates in a reverse direction, moves the friction-applying member in a direction that separates it from the friction-applied member, decreasing the braking force of the parking brake, and thereafter stops the operating of the motor and releases the braking force,
   the parking brake control device comprising:
   a determination means that, when the releasing control means acquires a motor electric current that flows when the motor is being operated, determines whether an absolute value of a differential value of the acquired motor electric current has exceeded a threshold value;
   an operation time setting means that, if it is determined by the determination means that the absolute value of the differential value of the acquired motor electric current has not exceeded the threshold value, sets a releasing operation time, based on the motor electric current at the time that the determination is made, that is a time from when the determination is made until the operating of the motor is stopped; and
   an operation stopping means that measures the releasing operation time that has been set by the operation time setting means, and stops the operating of the motor when the releasing operation time has elapsed after it is determined by the determination means that the absolute value of the differential value of the acquired motor electric current does not exceed the threshold value.

2. The parking brake control device according to claim 1, wherein the operation time setting means sets the releasing operation time to a longer time to the extent that the motor electric current has become greater.

3. The parking brake control device according to claim 2, wherein:
   the parking brake control device is applied in a brake system that includes
   an electric parking brake that includes an impelling shaft that, when the motor is operated such that it rotates, is moved in a straight line by a converting of the rotation of the motor into a linear movement, the movement of the impelling shaft moving the friction-applying member in the direction toward the friction-applied member when the motor is operated such that it rotates in the forward direction, thus causing the braking force to be generated by the electric parking brake, and the movement of the impelling shaft moving the friction-applying member in the direction separates it from the friction-applied member when the motor is operated such that it rotates in the reverse direction, thus causing the braking force to be decreased by the electric parking brake, and
   a service brake that, when a wheel cylinder pressure is generated within a brake fluid chamber by an operating of a brake pedal by a driver, generates a braking force by moving the friction-applying member in the direction toward the friction-applied member,
   wherein the friction-applying member is moved in a straight line by the linear moving of the impelling shaft within the brake fluid chamber.

4. The parking brake control device according to claim 3, wherein:
   the operation time setting means, based on the wheel cylinder pressure, which is detected by a pressure detection means, sets an additional time by which the releasing operation time is extended, and
   the operation stopping means measures a time that is the sum of the releasing operation time and the additional time that have been set by the operation time setting means, and stops the operating of the motor when the time that is the sum of the releasing operation time and the additional time has elapsed after it is determined by the determination means that the absolute value of the differential value of the acquired motor electric current does not exceed the threshold value.

5. The parking brake control device according to claim 4, wherein the operation time setting means sets the additional time to a longer time to the extent that the wheel cylinder pressure that is detected by the pressure detection means has become greater.

6. The parking brake control device according to claim 5, further comprising:
   a maximum value storage means that determines a maximum wheel cylinder pressure value that is the maximum value of the wheel cylinder pressure that is detected by the pressure detection means while in the releasing control, and that stores the maximum wheel cylinder pressure value,
   wherein the operation time setting means sets the additional time by which the releasing operation time is extended, based on the maximum wheel cylinder pressure value that is stored in the maximum value storage means.

7. The parking brake control device according to claim 4, further comprising:
   a maximum value storage means that determines a maximum wheel cylinder pressure value that is the maximum value of the wheel cylinder pressure that is detected by the pressure detection means while in the releasing control, and that stores the maximum wheel cylinder pressure value, wherein the operation time setting means sets the additional time by which the releasing operation time is extended, based on the maximum wheel cylinder pressure value that is stored in the maximum value storage means.

8. The parking brake control device according to claim 1, wherein:

the parking brake control device is applied in a brake system that includes an electric parking brake that includes an impelling shaft that, when the motor is operated such that it rotates, is moved in a straight line by a converting of the rotation of the motor into a linear movement, the movement of the impelling shaft moving the friction-applying member in the direction toward the friction-applied member when the motor is operated such that it rotates in the forward direction, thus causing the braking force to be generated by the electric parking brake, and the movement of the impelling shaft moving the friction-applying member in the direction separates it from the friction-applied member when the motor is operated such that it rotates in the reverse direction, thus causing the braking force to be decreased by the electric parking brake, and a service brake that, when a wheel cylinder pressure is generated within a brake fluid chamber by an operating of a brake pedal by a driver, generates a braking force by moving the friction-applying member in the direction toward the friction-applied member, wherein the friction-applying member is moved in a straight line by the linear moving of the impelling shaft within the brake fluid chamber.

9. The parking brake control device according to claim 8, wherein:

the operation time setting means, based on the wheel cylinder pressure, which is detected by a pressure detection means, sets an additional time by which the releasing operation time is extended, and the operation stopping means measures a time that is the sum of the releasing operation time and the additional time that have been set by the operation time setting means, and stops the operating of the motor when the time that is the sum of the releasing operation time and the additional time has elapsed after it is determined by the determination means that the absolute value of the differential value of the acquired motor electric current does not exceed the threshold value.

10. The parking brake control device according to claim 9, wherein the operation time setting means sets the additional time to a longer time to the extent that the wheel cylinder pressure that is detected by the pressure detection means has become greater.

11. The parking brake control device according to claim 10, further comprising:

a maximum value storage means that determines a maximum wheel cylinder pressure value that is the maximum value of the wheel cylinder pressure that is detected by the pressure detection means while in the releasing control, and that stores the maximum wheel cylinder pressure value, wherein the operation time setting means sets the additional time by which the releasing operation time is extended, based on the maximum wheel cylinder pressure value that is stored in the maximum value storage means.

12. The parking brake control device according to claim 9, further comprising:

a maximum value storage means that determines a maximum wheel cylinder pressure value that is the maximum value of the wheel cylinder pressure that is detected by the pressure detection means while in the releasing control, and that stores the maximum wheel cylinder pressure value, wherein the operation time setting means sets the additional time by which the releasing operation time is extended, based on the maximum wheel cylinder pressure value that is stored in the maximum value storage means.

* * * * *